(No Model.) 7 Sheets—Sheet 2.
H. M. ASHLEY.
APPARATUS FOR MANUFACTURING GLASS BOTTLES.
No. 517,016. Patented Mar. 27, 1894.
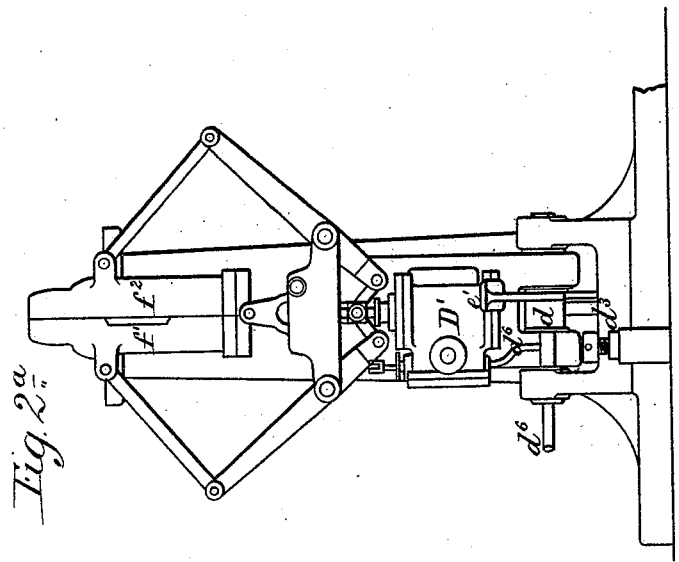
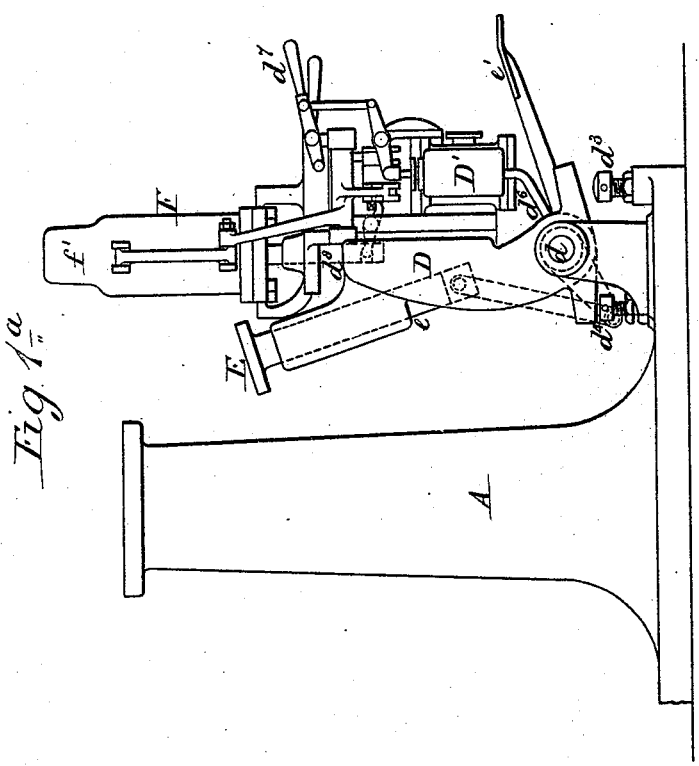
Attest:
Lowell Bartle
Geo. M. Whitney
Inventor:
Howard Matravers Ashley
By his Attorney
Francis Forbes

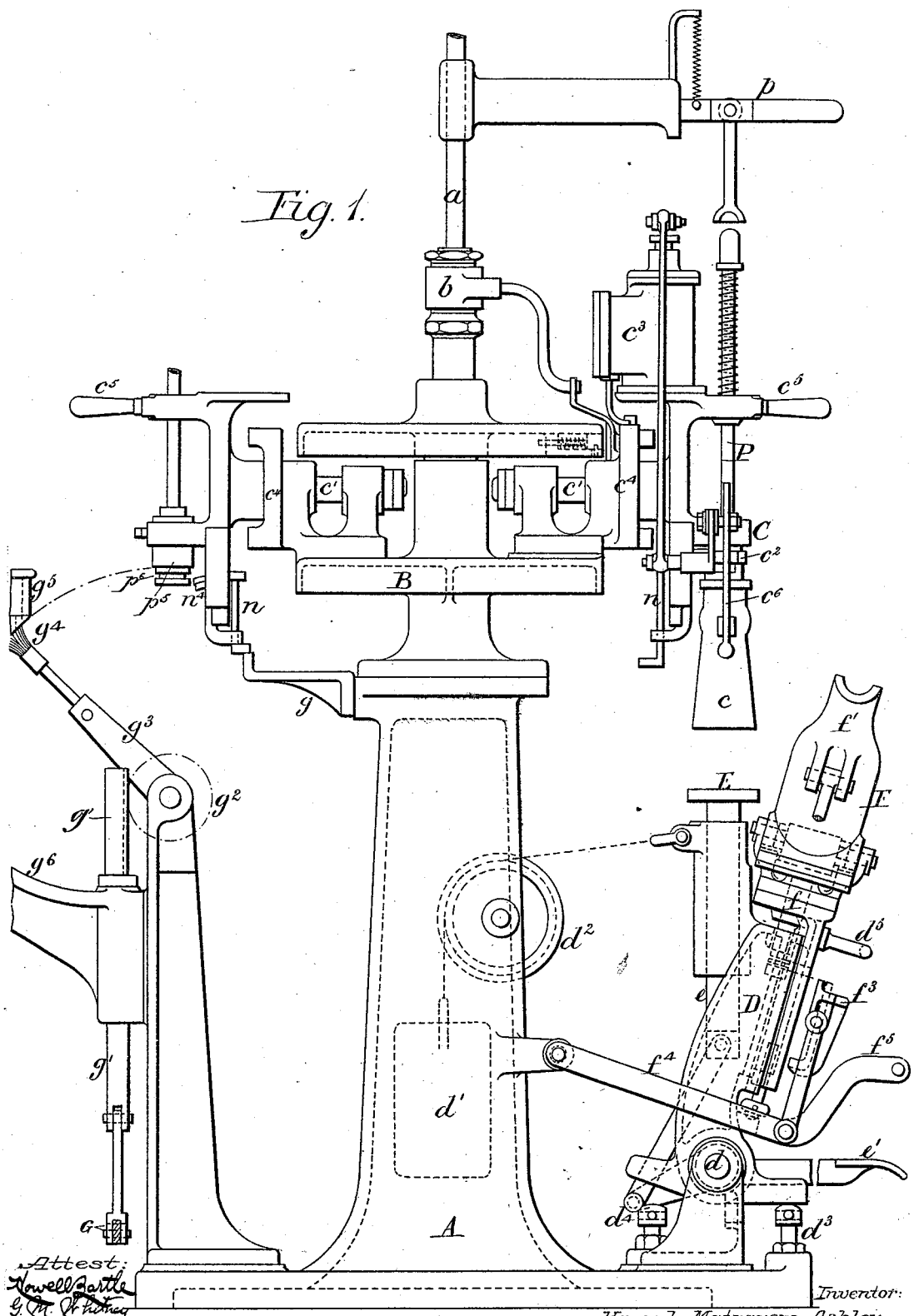

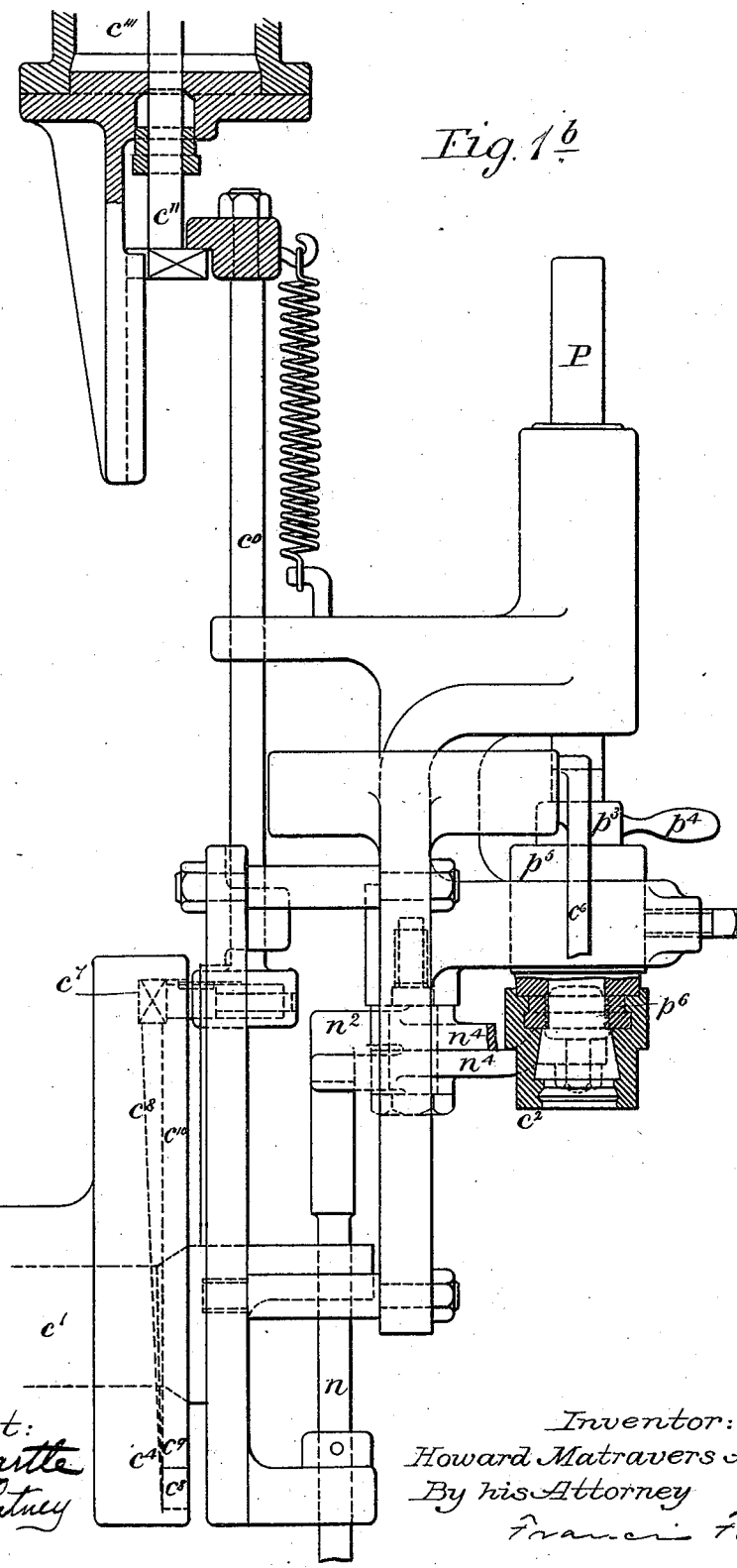

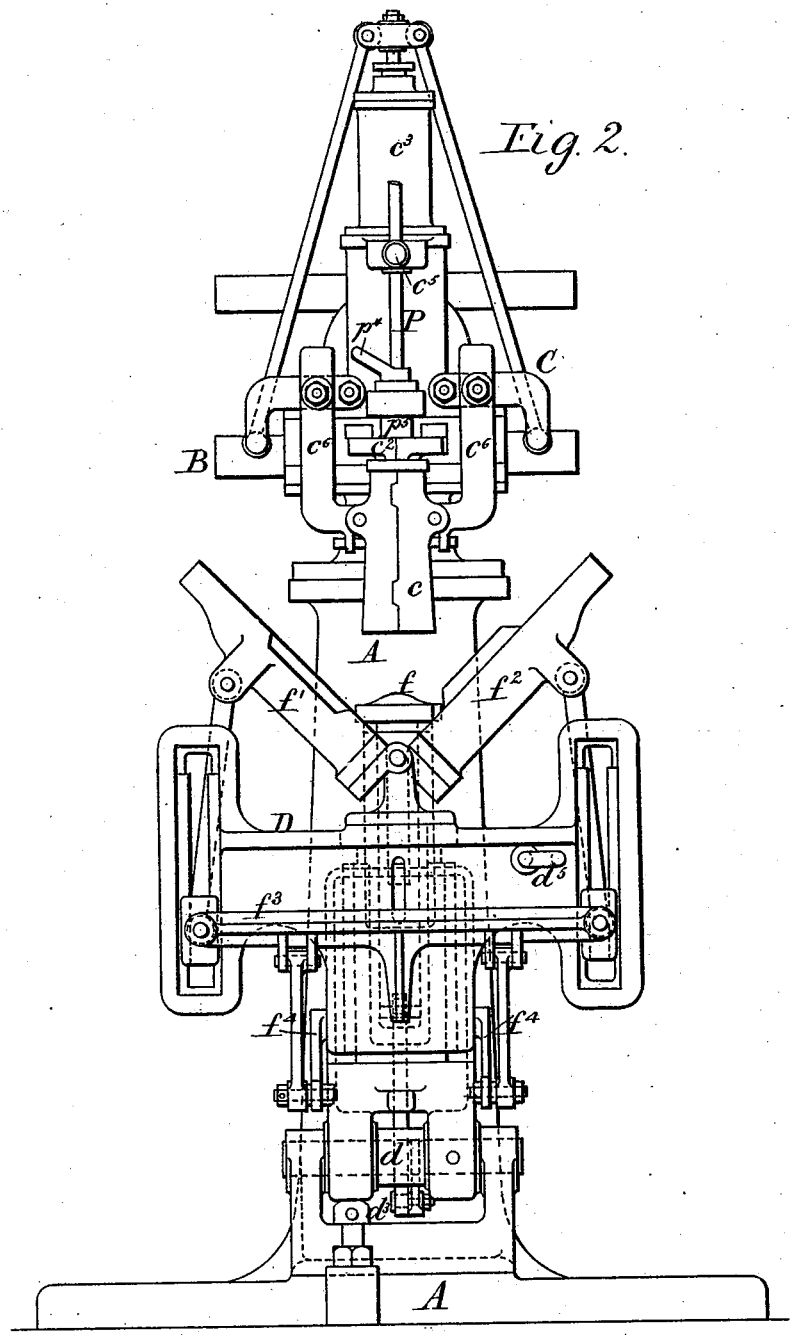

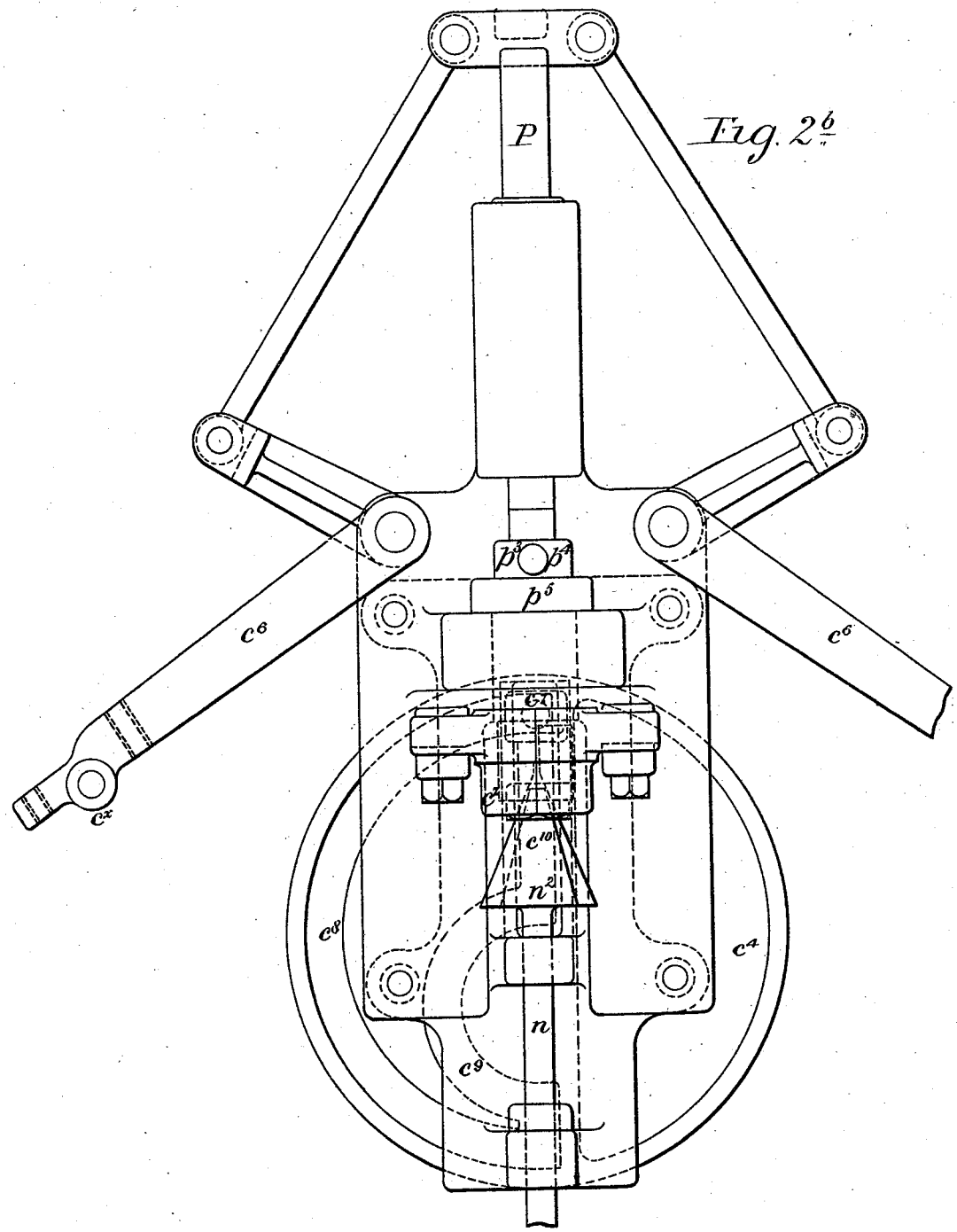

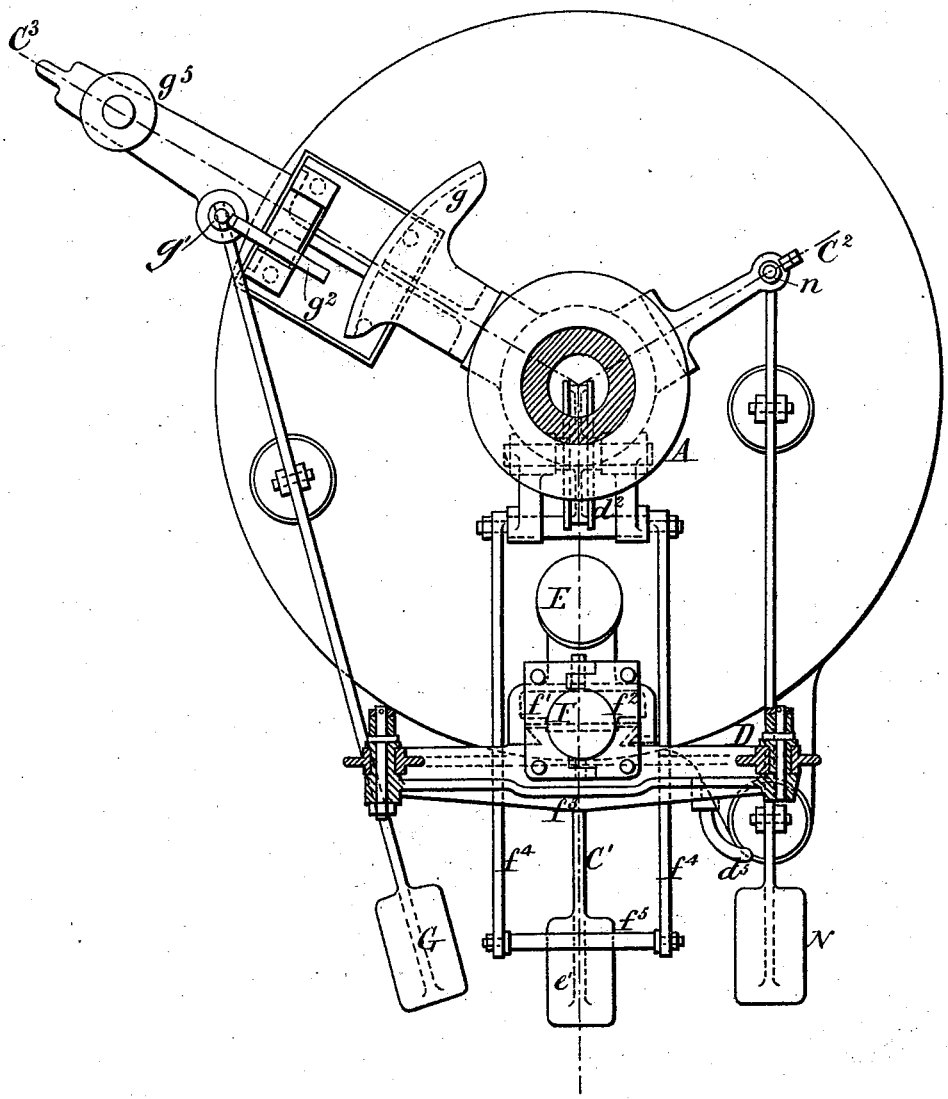

(No Model.) 7 Sheets—Sheet 7.
H. M. ASHLEY.
APPARATUS FOR MANUFACTURING GLASS BOTTLES.
No. 517,016. Patented Mar. 27, 1894.
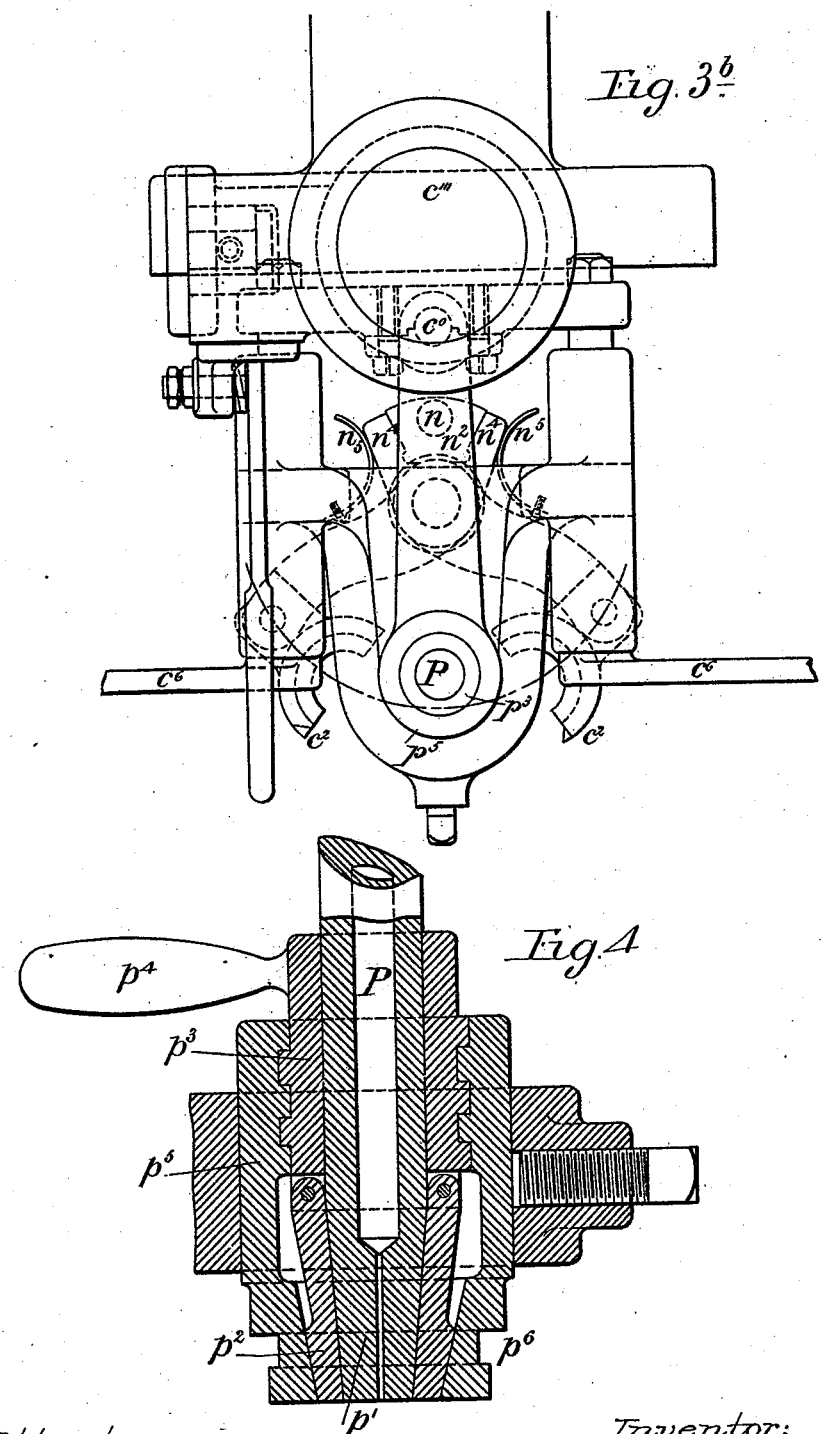

UNITED STATES PATENT OFFICE.

HOWARD M. ASHLEY, OF FERRYBRIDGE, ENGLAND, ASSIGNOR TO THE AMERICAN BOTTLE COMPANY, OF WOODBURY, NEW JERSEY.

APPARATUS FOR MANUFACTURING GLASS BOTTLES.

SPECIFICATION forming part of Letters Patent No. 517,016, dated March 27, 1894.

Application filed October 10, 1890. Renewed August 30, 1893. Serial No. 484,385. (No model.)

*To all whom it may concern:*

Be it known that I, HOWARD MATRAVERS ASHLEY, a citizen of England, residing at Ferrybridge, in the county of York, England, have invented new and useful Improvements in Apparatus for the Manufacture of Glass Bottles and Similar Hollow Glass Articles, of which the following is a specification.

In the specifications of patents already granted to me I have described apparatus for manufacturing glass-bottles and similar hollow glass articles according to a method which, being already known, forms no part of my present invention, but which I may here briefly describe, in order that the nature of my present improvements in the apparatus for operating according to that method may be the better understood.

Molten glass is poured into a cup-shaped mold, termed a parison-mold, below which there is a short hollow mold, which may be termed a neck-mold, for forming the mouth and part of the neck of the bottle, this mold being closed at the bottom by the end of a tubular punch, occupying its center, and a guide surrounding the punch. This punch is pushed upward into the body of plastic glass, and is withdrawn, thus forming a cavity in the center of the glass. The parison and neck molds containing the glass and also the punch are then inverted together, and the parison-mold is withdrawn, leaving the parison, or bulb of plastic glass, suspended from the neck-mold, which still embraces its upper portion. Air under a slight pressure being then introduced through the tubular punch into the cavity in the parison distends the glass, which also becomes elongated by gravity, and while this is going on the parison is puddled, that is to say, a plate or table is pushed up once or several times against the glass bulb so as to spread it out laterally, and the parison bulb, being thus somewhat roughly shaped, is inclosed within the finishing-mold, and, by the further admission of air under pressure to its interior, it is blown to the shape of the mold. This mold is then withdrawn, leaving the fully blown and externally shaped bottle suspended from the neck-mold, which is still closed around its upper part. The punch, which is now uppermost, being withdrawn, the neck mold is opened, leaving the bottle free to be removed. In said specifications of patents already granted to me, I have described two kinds of machines by which these successive operations are performed. In the one form of machine, which is of the "single" kind, there is a single set of the upper parts, including the parison and neck molds and the punch, mounted in a fixed position over a set of the lower parts, including means of working the punch, paddle and finishing mold; and in this machine when one bottle is made and removed, the same parts are employed again to make a succeeding bottle. In the other form of machine, which may be termed a "repeating" machine, while there is only one set of the lower parts, always in one position, there are several sets of the upper parts, mounted on a horizontally revolving table, and brought by its step by step revolution, successively over the stationary lower parts of the mechanism, so that the operations are performed in several stages as the revolving table assumes its successive positions. As I arrange the machine according to my present invention there are three positions taken by the table carrying three sets of the upper molding apparatus, and the successive operations are performed as follows: In the first position, glass is introduced into the parison-mold, and punched; the whole is inverted and the parison mold is withdrawn; the suspended parison is partly blown and paddled; it is inclosed within the finishing-mold and is fully blown; and, finally, the finishing-mold is withdrawn, leaving the bottle suspended by the neck-mold. In the second position, to which the suspended bottle is carried by a partial revolution of the table, the mouth of the bottle is shaped by the punch, the face end of which is somewhat tapered, and which is now pushed some way down within the mouth of the bottle, so as to give it a slightly flaring internal shape, and, the neck-mold being opened, the bottle is removed. In the third position of the upper molding apparatus, the neck-mold being then held open, exposing the end of the punch and its guide, these parts are greased by a reciprocating brush; and then, while the molding-apparatus is passing to its first position, it becomes inverted, so as to be ready to receive a fresh charge of glass when it reaches the first position.

Such being the general character of the operations performed by the apparatus, I shall describe the mechanism of the triple repeating machine, referring to the accompanying drawings.

Figure 1 is a side view, and Fig. 2 is a front view of the lower molding-apparatus and of one set of the upper parts, with the latter in the first position indicated at C' in Fig. 3, which is a plan of the lower parts; Fig. 1 showing also the greasing-apparatus of the third position, $C^3$. Fig. $1^a$ is a side view and Fig. $2^a$ a front view of a modified arrangement of the lower part of the molding-apparatus, in which a piston worked by steam or compressed air is employed to open and close the finishing-mold. Fig. $1^b$ is a side view partly in section; Fig. $2^b$ is a front view, and Fig. $3^b$ a plan, showing a modified arrangement of the upper part with a single cylinder and piston for opening and closing the three parison-molds successively. Fig. 4 is a section, to an enlarged scale, showing the nipple arranged for passage of a taper punch.

In all the figures the same reference letters are employed to indicate corresponding parts.

Referring first to Figs. 1, 2 and 3, A is the base and column carrying the revolving table B, on which are mounted at equal intervals three sets of the upper molding apparatus C, each of which, as indicated in Fig. 3, takes the successive positions C' $C^2$ $C^3$. Assuming that at C' molten glass has been introduced into the parison mold c which is at that time closed and standing with its mouth upward, then the lower part of the apparatus is brought into action, this apparatus being constructed and arranged as follows: On a horizontal center $d$ is mounted a rocking frame D, which is partly balanced by a weight $d'$, connected to it by a chain passing over a pulley $d^2$. The frame D can be rocked as far in each direction as is permitted by two adjustable stops $d^3$ $d^4$. When it is as in Fig. 1, resting against the stop $d^3$, a sliding rod $e$, carrying a plate or table E directly under the center of the molding apparatus C, can be raised by the operator depressing a treadle $e'$, which is linked to the rod $e$. By thus raising and then lowering the plate E, the punch P of the molding apparatus is pushed up and returned downward by its spring so as to form a cavity in the plastic glass occupying the parison-mold, as described in my former specifications. The molding-apparatus C is then turned by hand on its horizontal axis $c'$, so as to present the parison-mold $c$ mouth downward, as shown in Figs. 1 and 2, and the parison-mold is opened, its two halves being drawn aside, leaving the plastic glass parison suspended by the neck-mold $c^2$. When the parison mold $c$ is inverted and opened, a little air under pressure is admitted through the tubular punch P (which is now uppermost) into the cavity of the glass parison, and the operator by several depressions and releases of the treadle $e'$ raises and lowers the plate E so as to effect the "paddling" of the parison; that is to say somewhat flattening its bottom and bulging its sides, as it becomes gradually distended. The operator then, pressing with his knee against a bent stud $d^5$ projecting from the frame D, pushes the frame over till it rests against the stop $d^4$, in which position the finishing-mold F is brought directly under the center of the molding apparatus C as in Figs. 2 and 3. The finishing mold as shown consists of a bottom part $f$ and of two side parts $f'$ $f^2$ hinged and weighted so that they normally lie apart both inclined outward as in Figs. 1 and 2. They are linked to a crosshead $f^3$ which is linked to a pair of levers $f^4$, having their ends connected by a bar $f^5$. The operator, applying his hand to this bar, raises the levers $f^4$ and crosshead $f^3$, thus causing the two half molds $f'$ $f^2$ to close toward each other, inclosing within them the partly blown parison. By the contact of said cross head $f^3$ with a stop, at the same movement the bottom mold $f$, which is on a sliding rod provided with said stop, is raised to the desired height, and, the mold being thus closed, the operator by fully opening a cock or valve admits air under pressure through the tubular punch P to the interior of the parison, distending it to fit the finishing-mold. The blowing being effected, the air cock or valve, is closed by a spring, and the levers $f^4$ are lowered, thus opening apart the sides $f'$ $f^2$ and lowering the bottom $f$ of the mold, leaving the blown bottle suspended by the neck-mold $c^2$. The frame D then being rocked back to the position shown in Fig. 1, the finishing-mold is thus moved out of the way of the bottle, which is carried round by the revolving table to the next position, $C^2$, of the molding apparatus, and is there liberated by opening the neck-mold $c^2$.

According to the modification shown in Figs. $1^a$ and $2^a$ the rocking frame D carries a cylinder D' having its slide jacket supplied with compressed air or steam either by a flexible tube allowing for the rocking of the frame or by pipes $d^6$ conveying the fluid to and from a tubular trunnion $d$ forming part of said horizontal center. By means of a hand lever $d^7$ and connections (Fig. $1^a$) the operator can shift the slide valve of the cylinder D' so that the fluid pressure causes the piston of D' to descend, closing the sides of the finishing-mold, and at the same time, by means of a lever $d^8$, (Fig. $1^a$) raising the bottom of the finishing-mold. When the bottle is blown, the slide valve is moved back by the lever $d^7$, and the piston of D' rises, opening the sides of the finishing-mold, and lowering its bottom.

The upper part of the apparatus shown in Figs. 1 and 2 carries a cylinder $c^3$ fitted with a piston the rod of which is linked to the arms that carry the halves of the parison-mold $c$. The slide jacket of this cylinder is connected by a flexible pipe to a branch from a packed sleeve $b$ (Fig. 1) which, along with the revolving table B, can turn round the stationary pipe $a$ supplied with air under pressure. To the same sleeve, $b$, is connected the tubular plunger P, through a valve or cock, on opening which compressed air passes from the pipe $a$ into the interior of the parison, for blowing the glass. The compressed air supplied from $a$ to the slide jacket of the cylinder $c^3$ can by the movement of the slide-valve cause the piston in $c^3$ either to descend, closing together the parison mold $c$ as shown, or to ascend, opening the two halves of the parison-mold $c$ widely apart. Instead of moving the slide-valve of $c^3$ by hand, its movement may be effected by the turning of the molding apparatus C around its axis $c'$. For this purpose, the slide-valve rod of $c^3$ is engaged in a groove of a stationary eccentric or cam $c^4$, so that on turning the molding apparatus half round, by hand applied to the handle $c^5$, the slide valve of $c^3$ becomes shifted, causing the piston of $c^3$ to make its up and down stroke, and thereby to open and close the parison-mold $c$ through the connections shown in Figs. 1 and 2. Although this mold is shown closed in Fig. 2 it is to be understood that immediately after the molding apparatus C reaches this position the piston of $c^3$ will have ascended, opening the parison mold $c$. Before turning the molding apparatus half round to the position in which it is shown the parison mold is presented with its mouth upward, and is then closed ready to receive the molten glass. It is when the parison mold is in this condition that the punch P, which is then presented downward is pushed up by the paddling plate E to form the cavity in the plastic glass contained in the parison mold. After inverting and opening the parison mold, the punch P being then presented upward, as shown in Fig. 1 it is of advantage again to push the tapering face end of the punch P into the neck of the glass parison. For this purpose a spring lever $p$ is mounted on a bracket projecting from the stationary pipe $a$, and the operator by pulling down this lever pushes down the punch. On his letting go the lever $p$, it and the punch P are urged up again by their respective springs.

Instead of providing each of the three molding apparatuses C with its own cylinder $c^3$, a single cylinder, which may be supplied with steam, can be made to serve for the three molding apparatuses, as shown by Figs. $1^b$, $2^b$, and $3^b$. In this case a cylinder $c'''$ is fixed overhead immediately over the molding apparatus when it is in the position C'. A rod $c^0$ drawn downward by a spring is linked as shown in Fig. $2^b$ to the arms $c^6$ to which the halves of the parison mold are jointed at $c^x$ Fig. $2^b$. In the lower end of the rod $c^0$ is a spring stud $c^7$ which engages in a sloping semicircular eccentric groove $c^8$ in the face of the relatively stationary disk $c^4$, in which face there is also an inner semicircular concentric groove $c^9$ leading at its upper end to a straight vertical groove $c^{10}$ which meets the top of the groove $c^8$; the grooves $c^9$ $c^{10}$ are of the same depth as the lower end of $c^8$, the upper end of which is deeper. The piston rod $c^{11}$ of the cylinder $c'''$ terminates with a hook end, which as shown in Fig. $1^b$ can engage under a hook end of the rod $c^0$. The slide valve of the cylinder $c'''$ can be moved by hand applied to a spring lever so arranged that in obedience to the spring the slide valve is always in such a position that the piston rod $c^{11}$ is down, and it is only when the lever is moved in opposition to the spring that the piston rod is up in the position shown in Fig. $1^b$, the stud $c^7$ having then sprung into the deepest part of the groove $c^8$. On now turning the molding apparatus round its axis $c'$ the stud $c^7$ travels along the eccentric groove $c^8$, gradually closing together the arms $c^6$ and the halves of the parison mold which are jointed to them. When the molding apparatus is turned half round, the stud $c^7$ escapes from the groove $c^8$ into the groove $c^9$, completely closing together the halves of the parison mold which is then in condition to receive its charge of glass. On now turning the molding apparatus back the stud $c^7$ follows the concentric groove $c^9$ keeping the parison mold closed, and when the stud $c^7$ reaches the top of the groove $c^9$, being then at the bottom of the vertical groove $c^{10}$, and the hook of the piston rod $c^{11}$ being just under that of the rod $c^0$, the operator causes the piston rod $c^{11}$ to ascend drawing up the rod $c^0$ and thereby opening the parison mold which has its mouth now presented downward. When by this movement the stud $c^7$ reaches the top of the groove $c^{10}$ it springs into the deep upper part of the groove $c^8$ in position for a repetition of the movements above described.

I have already mentioned that the punch P has to be thrust into the plastic glass in the neck mold $c'$ and the parison mold $c$. Fig. 4 is a section to an enlarged scale showing how the taper end $p'$ of the punch P can pass through the nipple $p^2$. This nipple is made in three or more segments each hinged to a sleeve $p^3$ which has a rapid screw thread cut on it and can be turned by a handle $p^4$. All these parts are accommodated within a hollow boss $p^5$ which in its upper part has an internal screw thread fitting $p^3$, in its middle is a hollow in which the segments $p^2$, have room to expand, and at its lower end a groove $p^6$ to receive the halves of the neck mold $c^2$. At the time when the plastic glass is introduced into the parison mold, $p'$ and $p^2$ are in the position shown in Fig. 4 relatively to one another, but are upside down, with the neck mold $c^2$ fitted into $p^6$ and the closed parison mold $c$ fitted on the neck mold $c^2$. At this time the taper end $p'$ of the punch P has to be pushed into the plastic glass. In order to admit of its passing through the nipple, the operator by means of the handle $p^4$ turns the sleeve $p^3$ partly round, unscrewing it so that the segments $p^2$ are retracted into the cavity of the boss $p^5$, in which they are free to spread apart as the taper end $p'$ passes through them. After the bottle has been blown, it is carried suspended from the neck mold by the upper molding apparatus C moved round from the position C' to the position C² where it is to be freed from the neck mold $c^2$. This is effected in the following manner: By depressing a treadle N (Fig. 3) the operator raises a rod $n$ (Figs. 1ᵇ, 2ᵇ, and 3ᵇ) the upper end $n^2$ of which is wedge shaped so as to enter and spread apart two pivoted jaws $n^4$ to which the two halves of the neck mold $c^2$ are jointed as shown more clearly in Fig. 3ᵇ. On releasing the treadle N, the rod $n$ descends allowing springs $n^5$ to close the neck mold again. The bottle having been released by the opening of the neck mold in the position C², the upper molding apparatus C is now moved round to the position C³. As the rod $n$ approaches this position it moves along the inclined edge of a bracket $g$ (Figs. 1 and 3) and is thus pushed up, opening the neck mold, and leaving the faces of the boss $p^5$, the segmental sleeve $p^2$ and the punch $p$ exposed, as shown in Fig. 4, and as indicated on the left hand side of Fig. 1. When things are in this condition, the operator depresses a treadle G (Fig. 3) and thereby raises a rod $g'$ the upper end of which is a toothed rack gearing with a pinion $g^2$. On the axis of this pinion is fixed an arm $g^3$ (Fig. 1) carrying a brush $g^4$, which receives grease from a grease pot $g^5$, and is made by the depression of the treadle G to pass over $p^5$ greasing the face which is to form the bottom of the parison mold when it receives the next charge of glass.

Although I have described a repeating machine having the upper part C of the molding apparatus carried round with the revolving table B to the three successive positions C' C² and C³, the lower part D of the apparatus remaining always in the one position C', it is obvious that the upper part C might always remain in the position C' and that all parts of the operation could be carried on in that position, in which case the machine would become a single machine, with no material alteration of details except that the standard A and table B might be of more simple construction, as no turning of the table would be required, and that the apparatus for finishing the mouth opening the neck mold and greasing the nipple, instead of being arranged at the positions C² C³ respectively, would be arranged to operate at the position C'.

Having thus described the nature of my invention and the best means I know for carrying the same into practical effect, I claim as my invention the following characteristic features of apparatus for the manufacture of glass bottles and similar hollow glass articles:

1. A combined punch-actuator and paddling-plate, its vertical guide, and a treadle and connections for operating the same, in combination with a molding-apparatus above them, comprising parison and neck molds and a punch, and reversible on a horizontal axis.

2. A paddling-plate, a finishing-mold, and means for separately operating them, in combination with a laterally movable frame common to both, and means for suspending the parison within reach of said plate and said mold.

3. A paddling-plate, a finishing-mold, and means for separately operating them, in combination with a rocking-frame, common to both, which normally supports said plate in a vertical working position, and is movable laterally to bring the mold into that position.

4. The rocking frame D, carrying the paddling-plate E and finishing-mold F, in combination with the treadle $e'$ levers $f^4$ and connecting devices, for operating them.

5. The combination with the finishing-mold of the cylinder D', suitable conduits for a motor-fluid, and mechanical connections between the piston of the cylinder and the movable parts of the mold, substantially as shown and described.

6. The combination with the finishing-mold of the cylinder D', a rocking-frame, common to the mold and cylinder, having a tubular trunnion, conduits admitting a motor-fluid by way of said trunnion, and lever and link connections between the piston of the cylinder and the sides and bottom of the mold, substantially as shown and described.

7. The combination with a longitudinally divided parison-mold of a cylinder, its piston, and mechanical connections between said piston and the halves of the mold, for opening and closing such mold by fluid pressure.

8. A reversible molding-apparatus comprising a longitudinally divided parison-mold, a cylinder, $c^3$, a frame common to both, and mechanical connections between the piston of said cylinder and the halves of the mold, substantially as shown and described.

9. The combination of the punch P having a tapered face-end $p'$, the nipple-segments $p^2$, screw-sleeve $p^3$, and recessed "boss" $p^5$, substantially as shown and described.

10. The combination with a diametrically divided neck-mold of horizontally swinging jaws carrying its respective halves, springs by which the mold is kept normally closed, and a vertically moving rod carrying a wedge which acts on said jaws to open the mold.

11. The combination of the treadle N and its motion-transmitting connections, the wedge-ended rod $n$, and the spring-closed jaws $n^4$, with the halves of the neck-mold.

12. The greasing-apparatus, consisting of the treadle G and its motion-transmitting connections, the rack-rod $g'$, pinion $g^2$, brush $g^4$, and their mountings, in combination with the incline-bracket $g$, and devices coacting with said bracket to open the neck-mold.

13. An improved repeating-machine comprising three sets of upper molding-apparatus revolving intermittingly in a horizontal plane, a combined punch-actuator and paddling-plate and a finishing-mold located at a first stopping-point for each upper molding apparatus, a mouth finishing lever and neck-mold opening devices at a second stopping-point, and neck-mold opening devices and a greasing-apparatus at a third stopping-point, substantially as hereinbefore specified.

14. The combination, in a repeating-machine, of several sets of upper molding-apparatus each having a cylinder and connections for opening and closing the parison-mold by fluid pressure, and a central conduit supplied with a motor fluid and connected with the several cylinders, substantially as hereinbefore specified.

15. The combination, in a repeating-machine, of several sets of upper molding-apparatus each comprising a longitudinally divided parison mold, a rod having a hook end, and mechanical connections between said rod and the respective halves of the parison-mold, and a fixedly located single-acting cylinder having a hook-ended rod which coacts with the rod and connections first named to open the several parison-molds in succession, substantially as hereinbefore specified.

16. In combination with the halves of each reversible parison mold, a relatively stationary disk $c^4$ having a semi-circular groove $c^8$, of sloping depth, eccentric to the horizontal axis of reversion, an inner semi-circular groove $c^9$ concentric with said axis, and a straight vertical groove $c^{10}$, a spring-retracted rod $c^0$ having a spring stud $c^7$ which works in said grooves, and mechanical connections between said rod and the respective halves of the mold, substantially as shown and described, for automatically closing and fastening the mold in the manner set forth.

In testimony whereof I have signed my name to this specification, in the presence of two subscribing witnesses, this 26th day of June, A. D. 1890.

HOWARD M. ASHLEY.

Witnesses:
OLIVER IMRAY,
*Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*